(12) United States Patent
Sanguinetti et al.

(10) Patent No.: US 8,392,263 B2
(45) Date of Patent: Mar. 5, 2013

(54) METHOD AND SYSTEM FOR SELECTING AND CONVEYING RELEVANT AND PERSONALIZED GIFTS USING ONLINE PERSONAL GIFT PROFILE

(75) Inventors: Thomas V. Sanguinetti, La Jolla, CA (US); Dave T. Sanguinetti, La Jolla, CA (US); Jeffrey S. Ploetner, La Jolla, CA (US); Christine M. Dye, La Jolla, CA (US)

(73) Assignee: What Now, Inc., La Jolla, CA (US)

( * ) Notice: Subject to any disclaimer, the term of this patent is extended or adjusted under 35 U.S.C. 154(b) by 423 days.

(21) Appl. No.: 12/036,263

(22) Filed: Feb. 24, 2008

(65) Prior Publication Data

US 2009/0216653 A1 Aug. 27, 2009

(51) Int. Cl.
*G06Q 30/00* (2012.01)

(52) U.S. Cl. ............... 705/26.1; 705/27.1; 705/26.7; 705/26.8

(58) Field of Classification Search ............ 705/26, 705/27
See application file for complete search history.

(56) References Cited

U.S. PATENT DOCUMENTS

| | | |
|---|---|---|
| 6,611,814 B1 * | 8/2003 | Lee et al. ............... 705/26 |
| 2002/0095298 A1 | 7/2002 | Ewing |
| 2002/0116276 A1 | 8/2002 | Ottley |

OTHER PUBLICATIONS

The website/social network Kaboodle.com.*
"Online Retailers Add Bells, Whistles—Sites Spruce Up Special Features in Anticipation of Holiday Shopping" The Wall Street Journal Online. Asian Wall Street Journal. New York, N.Y.:Nov. 7, 2001. p. 8.*
Microsoft's website entitled Browse the Web with Internet Explorer 6 and Content Advisor dated Mar. 6, 2003.*
PCT/US/2008/080754 search report, Jan. 2, 2009, Tommy V. Sanguinetti.

* cited by examiner

*Primary Examiner* — Jeffrey A Smith
*Assistant Examiner* — Courtney Stopp
(74) *Attorney, Agent, or Firm* — Kyle Pendergrass

(57) ABSTRACT

A method and system selects and conveys relevant and personalized gifts using an online personal gift profile having personal preference data. The method includes providing, by a conveying user, the identity of a receiving user. The method includes selecting, by the conveying user, a gift-class. The method includes identifying the personal gift profile of the receiving user from the identity of the receiving user and retrieving the personal preference data of the receiving user from the personal gift profile. The method includes sending the selected gift item to the receiving user's physical address.

28 Claims, 7 Drawing Sheets

METHOD AND SYSTEM FOR SELECTING AND CONVEYING RELEVANT AND PERSONALIZED GIFTS USING ONLINE PERSONAL GIFT PROFILE

TECHNICAL FIELD

The invention relates generally to selecting and sending gift items and, more particularly, the invention relates to a method and system for selecting and sending relevant and personalized gift items using an online personal gift profile.

BACKGROUND OF THE INVENTION

Many e-commerce web sites enable online users to purchase a gift item and deliver the gift item to another user. Generally, the conveying user must know the physical address of the receiving user so that the gift item may be delivered. Also, the conveying user must find out what product or service the receiving user is interested in. Unless the conveying user knows the receiving user's interests in products or services, if the conveying user purchases a product and sends to the receiving user, there is a possibility that the receiving user may not like the product or that the receiving user may prefer another product.

Sometimes, the receiving user may be reluctant to tell the conveying user what products the receiving user would like to receive. The receiving user may be reluctant to seek gift items from others. Consequently, if the conveying user really wants to choose a gift for the receiving user, the conveying user may experience difficulty in getting the "right gift" for the receiving user.

Furthermore, the receiving user may not want to disclose his physical address to the conveying user. Since the receiving user may be reluctant to disclose his physical address to the conveying user, the conveying user may be prevented from sending a gift item to the receiving user even when the conveying user is really interested in getting the gift item to the receiving user.

Many social networking web sites have members that communicate with one another online. These members often get acquainted with one another online and may sometimes want to send a gift item to other members. However, because the members often do not know of other members' preferences in products and services, they experience difficulty sending the "right gift" to other members. Also, the member may be reluctant to disclose his physical address to others, thus preventing others from sending the gift item.

Accordingly, there is a need for a method and system that provides a solution to the foregoing problems.

SUMMARY

A method and system selects and conveys relevant and personalized gifts using an online personal gift profile having personal preference data. The method includes providing, by a conveying user, the identity of a receiving user. The identity of the receiving user is an electronic representation of the receiving user.

The method includes selecting, by the conveying user, a gift-class. The gift-class is selected online from a plurality of gift-classes. The gift-class includes a plurality of gift items. The method includes identifying the personal gift profile of the receiving user from the identity of the receiving user and retrieving the personal preference data of the receiving user from the personal gift profile. The preference data provides detailed information about the receiving user's interest or choice in one or more products or services.

The method includes determining from the personal preference data if the selected gift-class is acceptable to the receiving user and selecting a gift item from the gift-class using the personal preference data. The method includes sending the selected gift item to the receiving user's physical address. The physical address of the receiving user my optionally remain undisclosed to the conveying user.

DETAILED DESCRIPTION OF THE INVENTION

Figure 1:
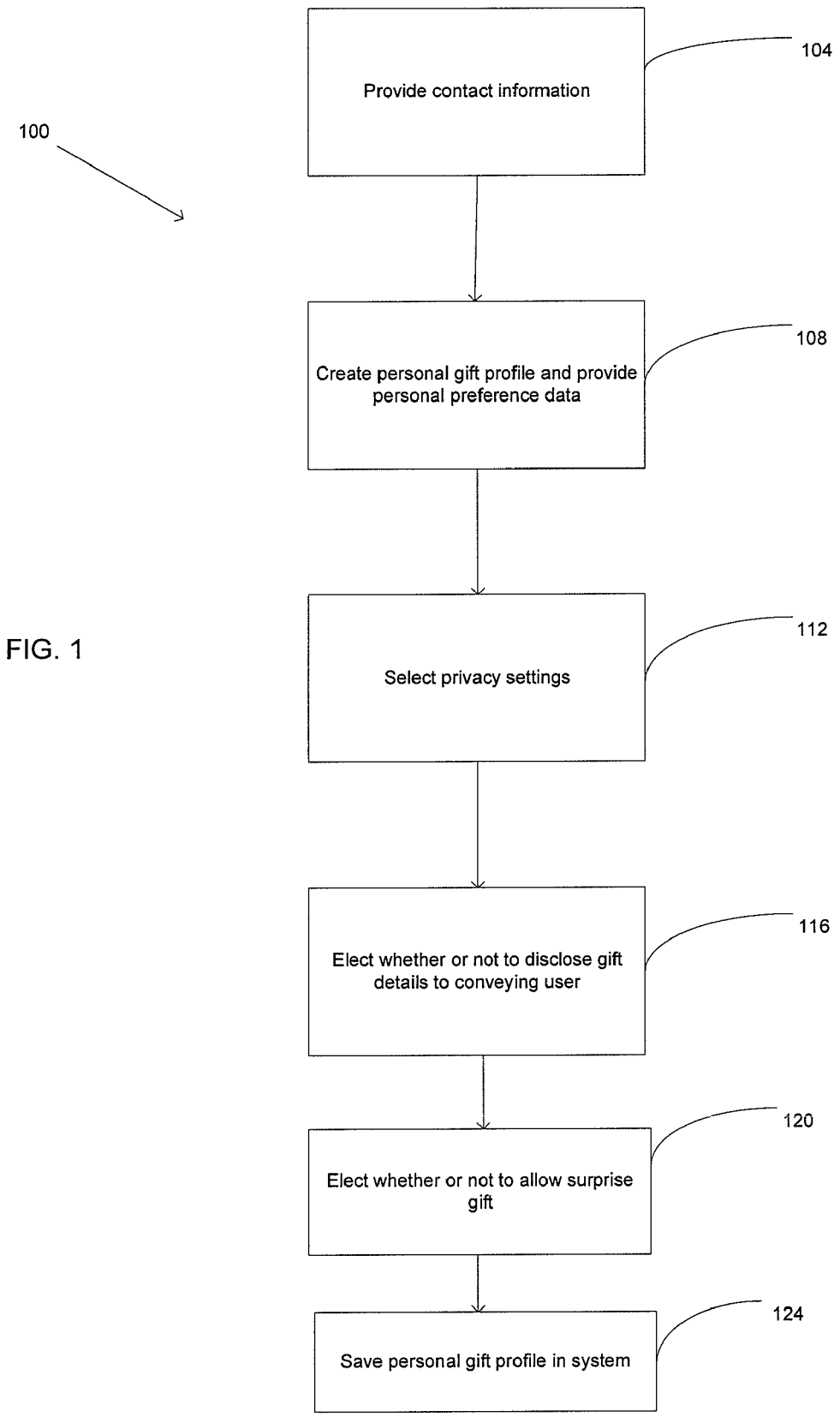
FIG. 1 is a flow diagram of the steps performed by a receiving user during the creation of a personal gift profile.

In one example embodiment, a method and system is provided for selecting and sending relevant and personalized gift items. The method and system assists a conveying user to find the "right gift" for a receiving user. The gift item may be any product or service. The method and system enables the receiving user to receive one or more products and services without disclosing the receiving user's physical address, such as a shipping address, to the conveying user. The method and system allows the conveying user to find the right product or service for the receiving user without disclosing the physical address of the receiving user to the conveying user. The method and system thus maintains the privacy of the receiving user while allowing the receiving user to get relevant and personalized gift items, i.e., products or services, from others.

The method and system utilizes an online personal gift profile, which includes personal preference data. The receiving user may create his online personal gift profile, or his online personal gift profile may be created or modified automatically by the system through analysis, containing the personal preference data. The personal preference data provides detailed information about the receiving user's interests or requirements in regard to one or more products or services. The personal preference data indicates the receiving user's preferences or choices related to one or more products or services. As will be discussed later, the personal preference data also indicates those products and services that are unacceptable to the receiving user. The personal preference data thus allows the receiving user to prevent others from sending gift items that are unacceptable to the receiving user.

Throughout this document, the user creating the online personal gift profile is referred to as the "receiving user" or the "recipient" and the user conveying the gift is referred to as the "conveying user" or the "sender." The conveying user may purchase the gift, i.e., any product or service, online and have the gift sent to the receiving user using a fulfillment system.

In one example embodiment, the method and system may be implemented in a computer system running an application for selecting and sending relevant and personalized gifts. In an illustrative implementation, the system may be deployed on an Internet web site that allows the conveying user to select and send relevant and personalized gifts to the receiving user. The system may also be deployed on an online social networking site having a plurality of users or members. By offering the system, the social networking site enables the conveying user to conveniently select and send relevant and personalized gifts to the receiving user.

As discussed before, the personal preference data indicates the receiving user's interests in, and preferences for, different types of products or services. The receiving user creates a personal gift profile that includes personal preference data. The personal preference data is generally stored in a data store such as a database maintained by the system. A portion of the personal preference data may be accessible in some form to the receiving user. The receiving user may change the personal preference data by adding new information to, or by removing information from, the personal preference data.

In one embodiment, the personal preference data lists a plurality of gift items, i.e., products and services, that are acceptable or preferred by the receiving user as well as those that are not acceptable, i.e., disallowed, by the receiving user. The gift items may be classified under one or more gift-classes. For example, the personal preference data may include the following information:

Allowed Gift-Classes
  1. Gift-Class: Clothing [Gift Items: Shirts; Pants; T-Shirts; Dresses]
  2. Gift-Class: Accessories [Gift Items: Hats; Belts; Scarves]
  3. Gift-Class: Linens [King Size; Queen Size; Cotton; Silk]
  3. Gift-Class: Food [Gift Items: Milk Chocolates; Dark Chocolates; Peanut Brittle; Strawberries]
  4. Gift-Class: Cosmetics and Skin-Care Products [Gift Items: Lotions; Soaps; Bath Products; Shower Gel]
  5. Gift-Class: Fragrances [Perfumes; Colognes; Candles; Incenses]
  6. Gift-Class: Beverages [Gift Items: Champagne; White Wine; Red Wine; Cabernet; Merlot; Chardonnay]
  7. Gift-Class: Books [Gift Items: Fiction; Non-Fiction; History; Politics]
Not Allowed or Unacceptable Gift-Classes
  1. Gift-Class: Jewelry
  2. Gift-Class: Gifts of Personal Nature The system allows the receiving user to provide additional details, including personal physical characteristics (e.g., allergy/medical information), regarding the acceptable products. The additional details enable the system to assist the conveying user to select the "right gift" for the receiving user. For example, the personal preference data includes information about the receiving user's clothing size or shoe size or skin type, thus allowing the conveying user to select a clothing item or a pair of shoes or a cosmetic item that fits or suits the receiving user. At the option of the receiving user, such additional information (e.g., weight, clothing size, shoe size, hair type, skin type) may remain hidden from the conveying user because the receiving user may not wish to disclose such information to others. The system utilizes the additional information for fulfillment purposes without disclosing such information to the conveying user.

The receiving user can select appropriate privacy settings in the personal gift profile to maintain confidentiality of selected information.

Some examples of additional details regarding acceptable products and services are provided below.

Gift-Class: Clothing [waist size; inseam length; height; collar length; sleeve length]
Gift-Class: Shoes [size; length; width]
Gift-Class: Accessories [head size for hats; glove size; sock size]
Gift-Class: Skin-Care Products [skin-type: dry, oily, sensitive;]
Gift-Class: Fragrances [Floral; Spicy; Herbal; Lavender; Citrus]
Gift-Class: Pillows and Mattresses [Down; Polyester; King; Queen; Extra Deep]
Gift-Class: Services [Massage Service; Maid Service; Car Wash; Dry Cleaning; Lawn Mowing]

As will be apparent to those skilled in the art, the personal preference data is maintained in a database in one or more well known database formats.

In one implementation, the personal preference data acts as a soft wish list of the receiving user. The soft wish list indicates that although the receiving user is not explicitly seeking any gifts, if a conveying user wants to buy a gift item for the receiving user, the conveying user should consider buying one of the gift items listed in the personal preference data. For example, if the conveying user wants to buy a lotion for the receiving user, the conveying user should get a particular brand of lotion listed in the personal preference data. If, for example, the conveying user wants to buy a clothing item, the conveying user should get a certain kind of pants that the receiving user really likes.

In one embodiment, the receiving user can indicate the degree of preference for, or interest in, one or more products. For example, the receiving user can indicate the degree of his preference for, or interest in, one or more products using a numerical scale or another scale, which is stored in the personal preference data. Thus, by using a scale, numeric or otherwise, the receiving user can indicate how interested he is in a particular product or service.

The system may use the degree of the receiving user's interest to suggest products or services to the conveying user who otherwise may be unsure of what to get. For example, a conveying user may want to get something for the receiving user but is unsure of what to get. The system can use the information about the degree of interest indicated in a numerical scale or another scale to recommend products or services to the conveying user. The degree of the receiving user's interest in one or more products or services will generally be disclosed to the conveying user unless the receiving user opts otherwise through the privacy settings of the personal gift profile.

The degree of the receiving user's interest in certain products or services allows the conveying user to select the "right gift" for the receiving user. In one embodiment, the receiving user may indicate the degree of his interest in all listed acceptable or allowed products. Thus, if the system identifies a plurality of gift items based on the conveying user's query and the personal preference data, the conveying user can use the degree of interest (as indicated in a numerical or another scale) to select the product that the receiving user is very interested in. For example, based on the conveying user's query (e.g., wine) and the receiving user's preference data, the system may identify Cabernet, Merlot and Pinot Noir all as being acceptable to the receiving user. Thus, the conveying user has the option of sending a bottle of Cabernet, Merlot or Pinot Noir to the receiving user since all are allowed based on the personal preference data. However, if the receiving user has indicated the degree of his interest in the wine by assigning a numerical value of 10 to Merlot and 7 to both Cabernet and Pinot Noir, the conveying user may select a bottle of Merlot since the receiving user has indicated that he is most interested in a Merlot. Thus, the receiving user's degree of interest in certain products or services (as indicated in a numerical or another scale) allows a conveying user to find the right gift for the receiving user when the conveying user is unsure what to get, and also allows the conveying user to find the right gift when the system suggests two or more products based on the conveying user's query and the preference data.

In one embodiment, the system presents the conveying user with choices of product or service gift-classes based on the receiving user's preferences and interests, without sharing details of any particular product or service. For example, the system may provide the following gift-class choices: wine, cosmetics, chocolates, baked goods, beauty services, and shoes. When the conveying user selects and conveys a gift-class, the system internally selects and conveys a specific product or service from within the selected gift-class, such as dark chocolate raspberry truffles from within the chocolates gift-class or beige face powder compact with SPF 15 for sun protection from within the cosmetics gift-class, based on the receiving user's personal preference data. Thus, specific information regarding the receiving user's personal preference data need not be shared with the conveying user.

FIG. 1 is a flow diagram 100 illustrating the steps performed by a receiving user during the creation of a personal gift profile. In step 104, the receiving user enters contact information such as shipping address, telephone number, and email address. The receiving user's contact information is not disclosed to the conveying user unless the receiving user explicitly consents to the disclosure of the contact information. By keeping the receiving user's contact information confidential, the system allows the receiving user to receive personalized and relevant gift items from others while maintaining confidentiality of the receiving user's physical address.

In step 108, the receiving user creates the personal gift profile by providing personal preference data. The personal preference data provides detailed information about the receiving user's interests in various products and services. The personal preference data also includes specific information about the receiving user (e.g., waist size, trouser length, sleeve length, shoe size, food allergies, fragrance preferences, food preferences, etc.). The personal preference may also indicate the receiving user's degree of interest in one or more products and services. The personal preference data has been described in detail before. In step 112, the receiving user selects the privacy settings for the personal preference data. The privacy settings allow the receiving user to keep selected personal preference data hidden from the conveying user. The privacy settings also allow the receiving user to selectively disclose certain personal preference data to the conveying user.

In step 116, the receiving user elects whether or not to disclose the details regarding the conveyed gift to the conveying user. In one implementation, the receiving user may elect not to disclose certain details of the conveyed gift (e.g., size and dimensions of a pair of pants) to the conveying user. As will be appreciated, there are many classes of gifts (e.g., clothing, shoes, etc.) whose detailed disclosure may reveal personal information of the receiving user. Consequently, the receiving user may prefer to not disclose certain personal information about the conveyed gift even to the conveying user. For example, the receiving user may elect to disclose the kind of pants that was selected using the system but keep the size and dimension information confidential. Also, for example, the receiving user may elect to disclose the brand of lotion that was selected using the system but may decide to not disclose the fact the lotion is for oily skin-type.

In step 120, the receiving user elects whether to require notification prior to the delivery of the gift item. The receiving user may require prior notification for the gift delivery including details about the gift item or may allow the conveying user to send the gift item without prior notification, i.e., a surprise gift. In step 124, the personal gift profile is saved in the system.

Figure 2:
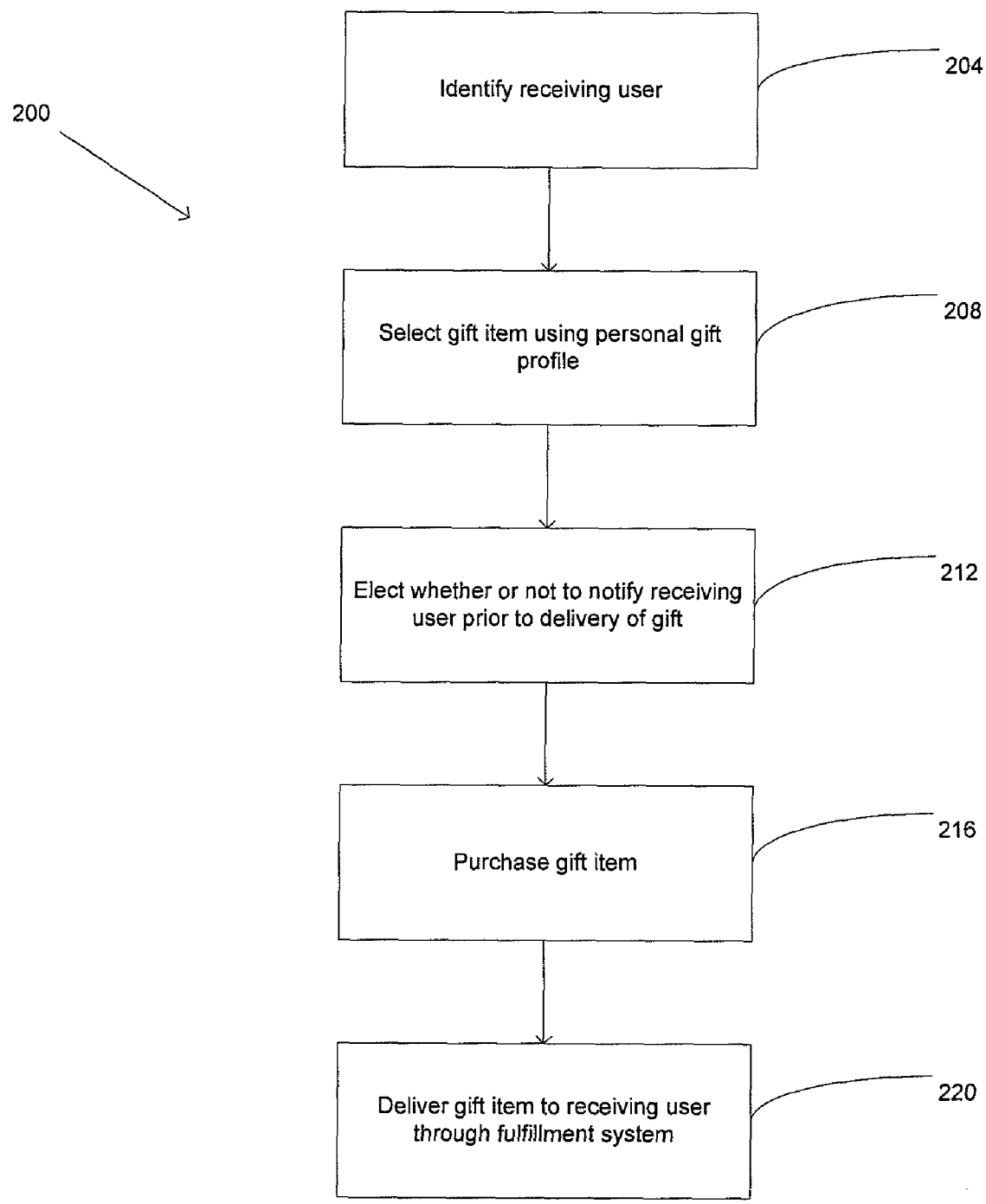
FIG. 2 is a flow diagram of the steps performed by a conveying user during the selection of personalized and relevant gift items.

FIG. 2 is a flow diagram 200 illustrating the steps performed by the conveying user during the selection of a personalized and relevant gift using the system. In step 204, the conveying user identifies the receiving user. The conveying user may identify the receiving user by the receiving user's electronic ID such as a user ID, a name, an icon, an email address, a phone number (if allowed by the receiving user) or any electronic representation of the receiving user. In step 208, the conveying user selects a gift item with the assistance of a portion of the receiving user's gift profile. In one example implementation, if the receiving user does not have a gift profile set up, the system may optionally contact the receiving user and suggest that the receiving user create a gift profile because other users may be interested in sending gifts to the receiving user. The selection of the gift item is described in more details below. In step 212, if permissible by the receiving user's personal gift profile, the conveying user may elect whether to notify the receiving user prior to the delivery of the gift or not. If the receiving user's personal gift profile requires that the receiving user must be notified prior to delivery of any gift, the conveying user will not be allowed to send a surprise gift to the receiving user.

In one example implementation, if the receiving user's personal gift profile prohibits surprise gifts, the system may prompt the receiving user with a message such as "Jeff, a conveying user, wants to send you a surprise gift. Do you accept?" If the receiving user declines to accept the surprise gift, the system will reveal to the receiving user what the gift item is and allow the receiving user to either accept or decline the gift.

In step 216, the conveying user purchases the selected gift item. The conveying user may purchase the gift item online by making an electronic payment using a credit card. In one example implementation, if the price of the gift item may reveal certain personal information about the receiving user (e.g., extra large dress size cost $40; small dress size cost $30), the system may charge one price (e.g., the higher price) regardless of the size in order to mask the actual item purchased. In step 220, the gift item is delivered to the receiving user's physical shipping address without the disclosure of the address to the conveying user. Thus, the system allows the receiving user to receive gift items from the conveying user without disclosing the physical shipping address of the receiving user.

Figure 3:
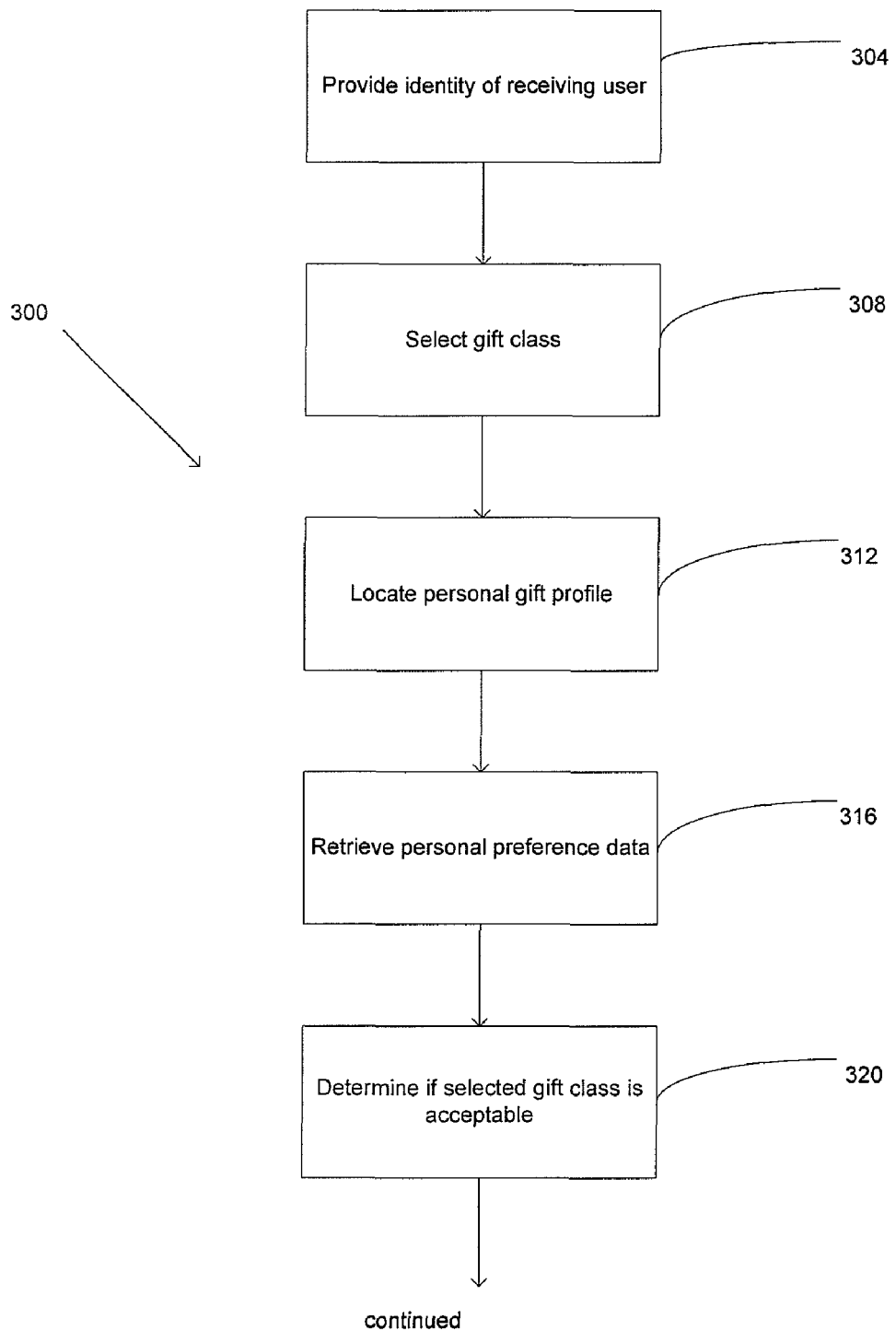
FIG. 3 is a detailed flow diagram of the steps for selecting and conveying personalized and relevant gift items in accordance with one embodiment.
Figure 3:
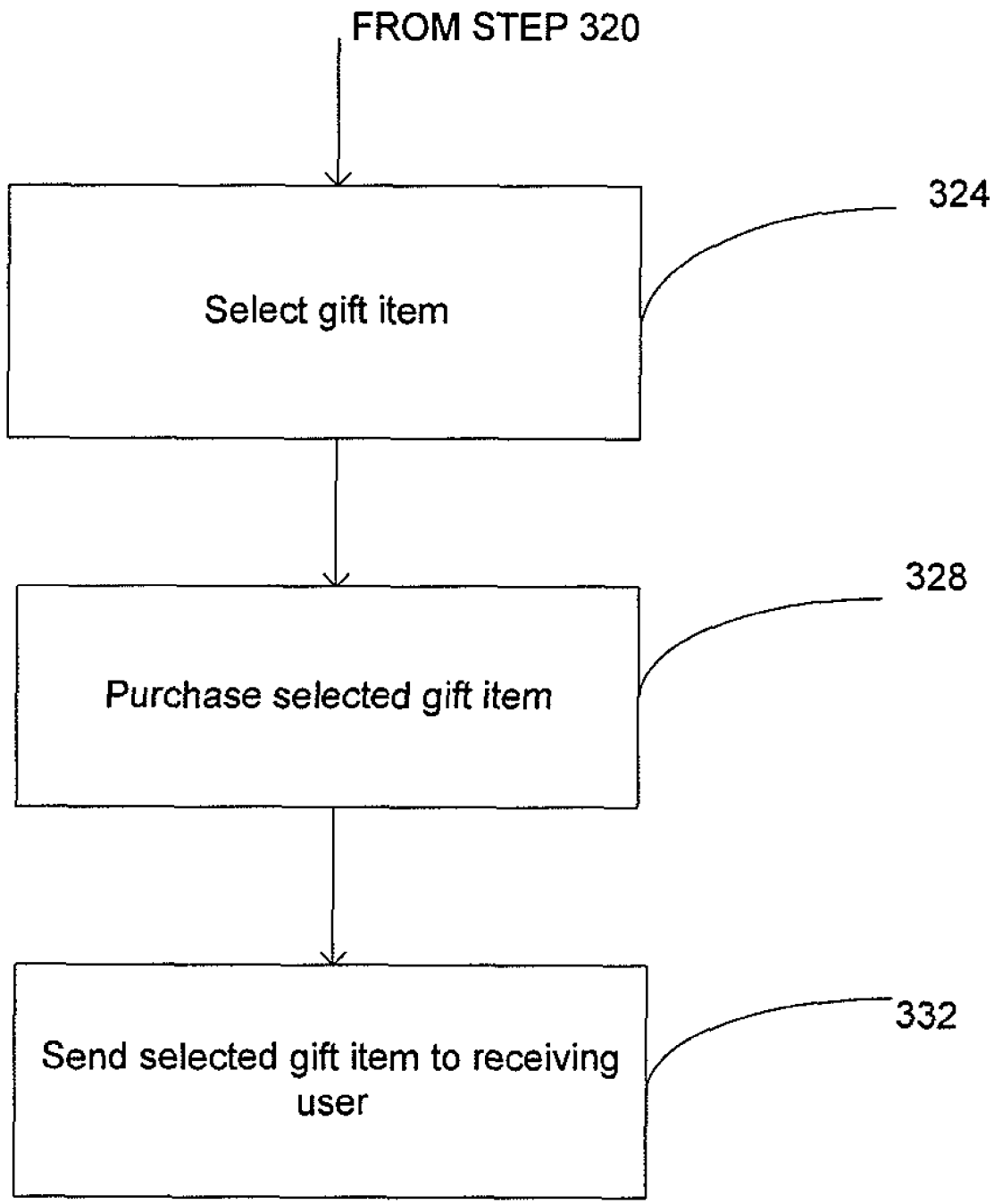

FIG. 3 is a detailed flow diagram 300 illustrating the steps of selection and conveyance of a personalized and relevant gift. In step 304, the conveying user provides the identity of the receiving user. As discussed before, both the conveying user and the receiving user may be members of an online social network. The receiving user may be identified by an electronic ID, a user name, an icon or any other electronic representation of the receiving user.

In step 308, the conveying user selects a gift-class. The gift-class includes a plurality of items belonging to the same class. A gift class may, for example, be clothing, which includes shirts, trousers, sweaters, t-shirts, undergarments, etc. Another gift class may be accessories, which include hats, belts, scarves, handbags, etc. Another gift-class may be chocolates, which include dark, milk, white and other types of chocolates. The gift class may be selected online from a plurality of gift classes available.

In step 312, the personal gift profile of the receiving user is identified or located from the receiving user's electronic ID. In step 316, the personal preference data of the receiving user is retrieved from the personal gift profile. As discussed before, the personal gift profile, including the personal preference data, may reside in a database. The preference data provides detailed information about the receiving user's interests or choices in one or more products and services.

In step 320, the personal preference data is used to determine if the selected gift-class is permissible. The receiving user may identify gift-classes and gift items that are acceptable. The personal preference data may also be used to identify those gift-classes and gift items that are not acceptable to the receiving user. In step 324, if the personal preference data indicates that the gift-class is permissible, a particular gift item is selected using the personal preference data. The selected gift item belongs to the gift-class. If the selected gift-class or gift item is not permissible according to the receiving user's personal gift profile, the conveying user is notified accordingly.

In step 328, the conveying user purchases the selected gift item if the gift item is permissible according to the receiving user's personal gift profile. The gift item may be purchased online using a credit card or by other payment methods.

In step 332, the selected gift item is shipped to the receiving user's shipping address. The receiving user's shipping address is not disclosed to the conveying user. If the personal gift profile of the recipient allows for the delivery of a surprise gift, the conveying user may send the gift to the receiving user without any prior notification of the gift. Otherwise, the receiving user may be notified in some form of the shipment or delivery of the gift.

As discussed before, in some instances, although the conveying user has selected and purchased the gift for the receiving user, the personal gift profile of the receiving user may require that certain details of the selected gift item are not disclosed to the conveying user. If certain details of the selected gift item may reveal information that the receiving user desires to keep confidential, such information will not be disclosed to the conveying user. For example, the conveying user may select a lotion using the above-described method, but the receiving user's personal gift profile may prevent the disclosure of the fact that the lotion is for persons with oily skin. Thus, the personal gift profile allows the conveying user to select a personal and relevant gift for the receiving user but at the same time prevent disclosure of certain information that the receiving user wants to keep confidential.

In one example implementation, the system can assist the conveying user in finding the right gift item for the receiving user even when the conveying user is unsure about the gift item or the gift-class. Suppose the conveying user wants to get "something sweet" for the receiving user, but is unsure exactly what to get. The system can search the receiving user's personal preference data using the search query "something sweet" and find relevant gift classes. The system then identifies one or more gift items that the receiving user would like to receive from the information in the personal preference data. Thus, the system may identify strawberries, milk chocolate, or peanut brittle as the gift items preferred by the receiving user.

Figure 4:
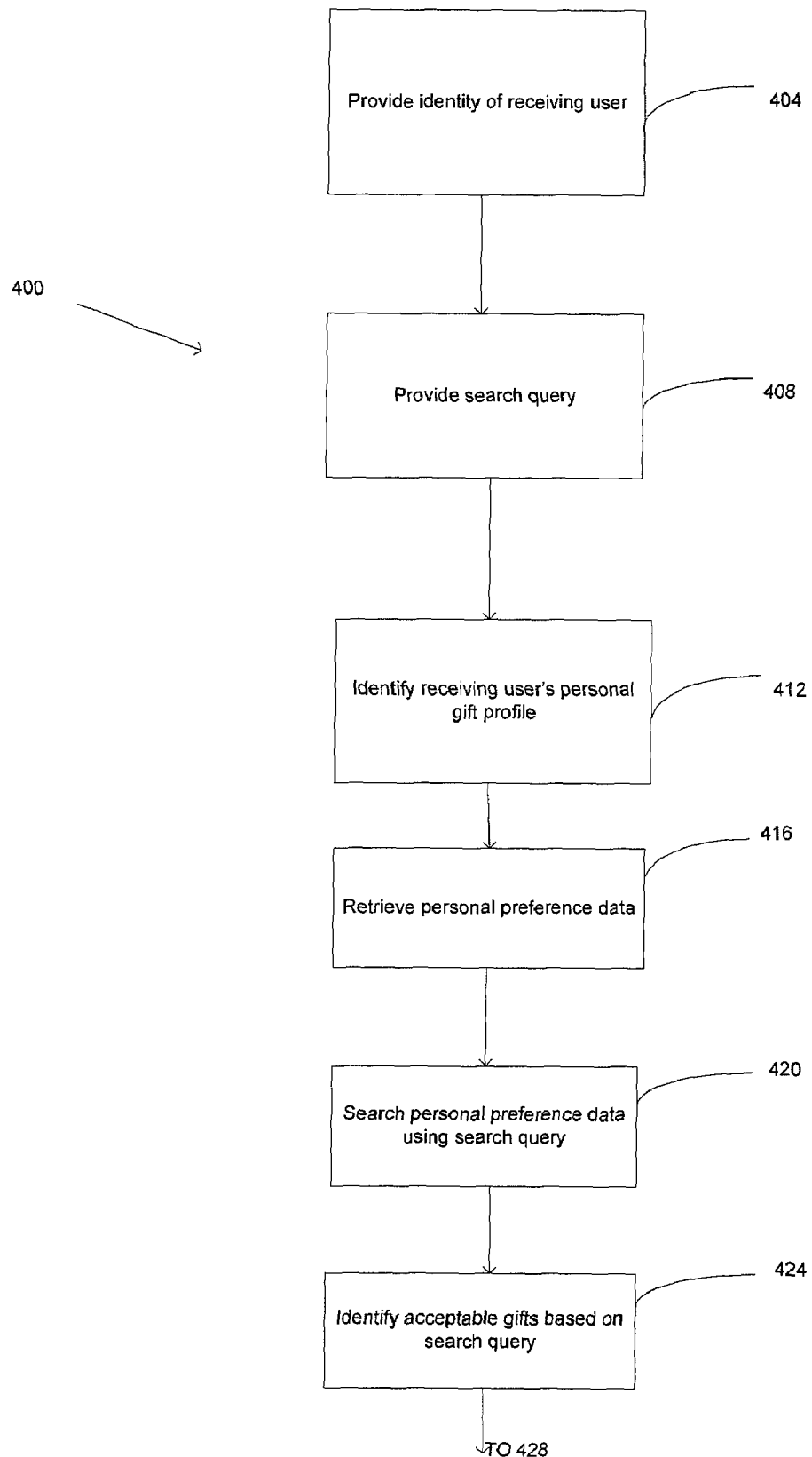
FIG. 4 is a flow diagram of the method steps for selecting and conveying relevant and personalized gift items in accordance with another embodiment.
Figure 4:
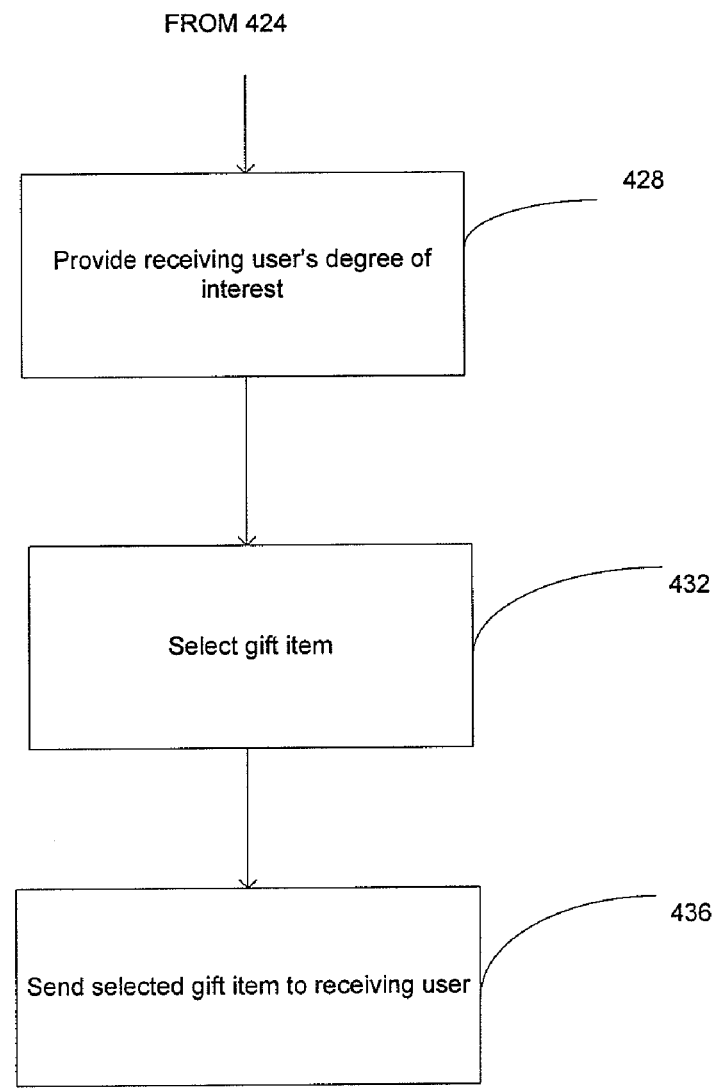

FIG. 4 is a flow diagram 400 illustrating the method steps for selecting and sending relevant and personalized gift items in accordance with another embodiment. In step 404, the conveying user provides the identity of the receiving user. As discussed before, the conveying user may identify the receiving user by a user name, a user ID, an icon or any other electronic representation of the receiving user. In step 408, the conveying user provides a search query related to a gift item (e.g., "something sweet," "wine", "fragrances").

In step 412, the system identifies or locates the receiving user's personal gift profile from the receiving user's user ID. In step 416, the receiving user's personal preference data is retrieved from the personal gift profile. As discussed before, the personal preference data provides detailed information about the receiving user's interests or choices in one or more products and services.

As discussed before, the receiving user may opt to keep his personal preference data confidential from the conveying user by selecting the appropriate privacy settings in the personal gift profile. The personal preference data may be stored in a data store such as a database.

In step 420, the system searches the personal preference data using the search query. In step 424, the system identifies one or more acceptable gift items based on the search query and the personal preference data. In step 428, the system provides to the conveying user the degree of interest of the receiving user in the identified gift items. The degree of interest may be indicated in a numerical scale or any other scale to demonstrate the receiving user's intensity of interest in the gift items. In 432, a gift item is selected from the identified acceptable gift items. In step 436, the selected gift item is sent to the receiving user's physical address. The receiving user's physical address is not disclosed to the conveying user unless such disclosure is authorized by the receiving user.

In one implementation, the system automatically modified the receiving user's personal gift profile after the receiving user receives a particular gift. For example, if the receiving user receives a particular gift item from a conveying user, the receiving user may not wish to receive more of the same gift items from others. The system will automatically modify the personal gift profile by removing a received gift item from the list of desired gift items or may change the degree of preference for the received gift item. The system may optionally prompt the receiving user to change his personal gift profile after the receipt of the gift item.

In an illustrative implementation, the system includes a user interface to enter search query information related to one or more gift items. The system searches the personal preference data of the receiving user to identify one or more acceptable gift items. The personal preference data may list detailed information about the receiving user's interest in one or more products and services according to a predefined data classification. The user may access the search system via the Internet using a computing device such as a personal computer, a lap-top computer, a smart phone or a wireless device. The search system may comprise a means for displaying the search results. In operation, the search engine polls the data store according to a predefined set of rules and instructions for the relevant and personalized gift items.

In one example implementation, the system automatically creates the receiving user's personal gift profile from the receiving user's prior online purchases, online activities and experiences and online feedback. For example, the system automatically compiles data related to the receiving user's purchases of various products and services. The system may also receive feedback from the receiving user regarding the receiving user's preferences and interests or choices in one or more products and services. Based on the receiving user's online purchases and feedback, the system can automatically create the personal gift profile having the personal preference data. The system can recommend one or more gift items to the conveying user based on the information stored in the personal gift profile. For example, in response to a query from the conveying user, the system may recommend one or more gift items based on the automatically created personal gift profile.

Figure 5:
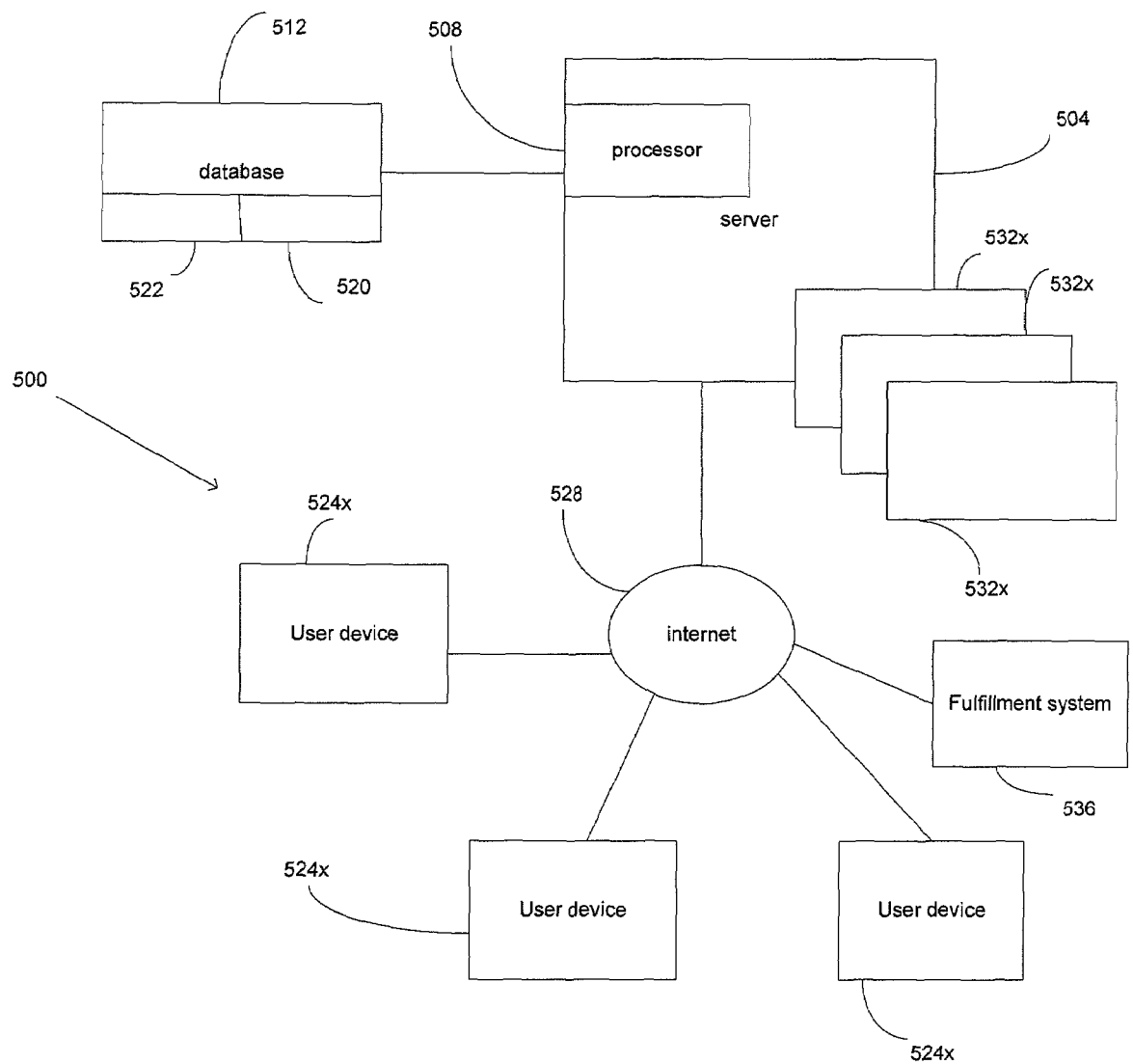
FIG. 5 is system for selecting and sending personalized and relevant gift items in accordance with one embodiment.

FIG. 5 is system 500 for selecting and sending personalized and relevant gift items in accordance with one example embodiment. The system 500 may be deployed on an Internet web site such as a social networking site that includes a plurality of users.

The system 500 includes a server 504 having a processor 508. The server 504 is connected to a data store such as a database 512. The database 512 contains the personal gift profile 520 including the personal preference data 522. The personal preference data 522 contains a plurality of gift-classes and gift items. Responsive to one or more user provided search queries, the processor 508 searches the personal preference data 522 for one or more gift items and provides a result having one or more identified and acceptable gift items. The processor 508 may be a special purpose processor configured to search a database.

The server 504 is connected to a plurality of user devices 524x via a communication network such as the Internet 528. The user device 524x may be a personal computer, a lap-top computer, a PDA, a smart phone or any other computing device. A user may use the user device 524x to connect with the server 504 via the Internet 528. The server 504 is configured to serve one or more web pages 532x to the user devices 524x. The user devices 524x use the web pages 532x to input search queries. The system 500 also provides the search result on one or more web pages 532x. The system 500 includes a fulfillment system 536 coupled to the Internet to initiate the delivery of the selected gift items. The fulfillment system 536 conveys the selected gift item to the receiving user. As will be understood by those skilled in the art, the fulfillment system 536 may be implemented by the system or may be an independent e-commerce company such as Amazon.com or Overstock.com.

In one example embodiment, a computer program product having a computer readable medium embodies a plurality of computer readable codes for executing the method steps described in the foregoing for searching venues.

The system, method, computer program product may, of course, be embodied in hardware; e.g., within or coupled to a Central Processing Unit ("CPU"), microprocessor, microcontroller, System on Chip ("SOC"), or any other programmable device. Additionally, the system, method, computer program product, and propagated signal may be embodied in software (e.g., computer readable code, program code, instructions and/or data disposed in any form, such as source, object or machine language) disposed, for example, in a computer usable (e.g., readable) medium configured to store the software. Such software enables the function, fabrication, modeling, simulation, description and/or testing of the apparatus and processes described herein. For example, this can be accomplished through the use of general programming languages (e.g., C, C++), GDSII databases, hardware description languages (HDL) including Verilog HDL, VHDL, AHDL (Altera HDL) and so on, or other available programs, databases, nanoprocessing, and/or circuit (i.e., schematic) capture tools. Such software can be disposed in any known computer usable medium including semiconductor, magnetic disk, optical disc (e.g., CD-ROM, DVD-ROM, etc.) and as a computer data signal embodied in a computer usable (e.g., readable) transmission medium (e.g., carrier wave or any other medium including digital, optical, or analog-based medium). As such, the software can be transmitted over communication networks including the Internet and intranets. A system, method, computer program product, and propagated signal embodied in software may be included in a semiconductor intellectual property core (e.g., embodied in HDL) and transformed to hardware in the production of integrated circuits. Additionally, a system, method, computer program product, and propagated signal as described herein may be embodied as a combination of hardware and software.

One of the implementations of the present invention is as a routine in an operating system made up of programming steps or instructions resident in a memory of a computing system as well known, during computer operations. Until required by the computer system, the program instructions may be stored in another readable medium, e.g. in a disk drive, or in a removable memory, such as an optical disk for use in a CD ROM computer input or in a floppy disk for use in a floppy disk drive computer input. Further, the program instructions may be stored in the memory of another computer prior to use in the system of the present invention and transmitted over a LAN or a WAN, such as the Internet, when required by the user of the present invention. One skilled in the art should appreciate that the processes controlling the present invention are capable of being distributed in the form of computer readable media in a variety of forms.

Any suitable programming language can be used to implement the routines of the present invention including C, C++, Java, assembly language, etc. Different programming techniques can be employed such as procedural or object oriented. The routines can execute on a single processing device or multiple processors. Although the steps, operations or computations may be presented in a specific order, this order may be changed in different embodiments. In some embodiments, multiple steps shown as sequential in this specification can be performed at the same time. The sequence of operations described herein can be interrupted, suspended, or otherwise controlled by another process, such as an operating system, kernel, and the like. The routines can operate in an operating system environment or as stand-alone routines occupying all, or a substantial part, of the system processing.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "computer-readable medium" for purposes of embodiments of the present invention may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory.

A "processor" or "process" includes any human, hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented by using a general purpose digital computer, software applications, routines and software modules, hardware including application specific integrated circuits, programmable logic devices, field programmable gate arrays, optical and other mechanisms may be used. In general, the functions of the present invention can be achieved by any means as is known in the art. Distributed, or networked systems, components and circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims. Thus, the scope of the invention is to be determined solely by the appended claims.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A method for selecting and sending relevant and personalized gifts using an online personal gift profile having personal preference data, comprising:
   providing, by a conveying user, the identity of a receiving user, the identity being an electronic representation of the receiving user on an input device;
   selecting, by the conveying user, a gift-class, the gift-class being selected online from a plurality of gift-classes, the gift-class comprising a plurality of gift items using the input device;
   identifying, by a processor, the personal gift profile of the receiving user from the identity of the receiving user;
   retrieving, by the processor the personal preference data of the receiving user from the personal gift profile, the preference data providing detailed information about the receiving user's choices regarding one or more products and services;
   determining, by the processor, from the personal preference data if the selected gift-class is acceptable to the receiving user;
   selecting by the processor a gift item from the gift-class using the personal preference data, wherein the identity of the selected gift item is not disclosed to the conveying user prior to its purchase; and
   sending, by the processor, the selected gift item and the receiving user's physical address to a fulfillment center.

2. The method according to claim 1, further comprising purchasing the selected gift item online prior to sending to the receiving user.

3. The method according to claim 1, wherein at least a part of the personal preference data remains hidden from the conveying user.

4. The method according to claim 1, further comprising notifying the receiving user prior to the delivery of the selected gift item.

5. The method according to claim 4, further comprising disclosing detailed information about the selected gift item to the conveying user if permissible by the personal gift profile.

6. The method according to claim 1, further comprising notifying the conveying user if the gift item is not permissible based on the personal gift profile.

7. The method according to claim 1, further comprising purchasing the selected gift item online prior to sending to the receiving user.

8. The method according to claim 1, further comprising creating the personal gift profile by deducing the receiving user's choices for products and services from the receiving user's online activities.

9. The method according to claim 1, further comprising creating the personal gift profile by deducing the receiving user's choices for products and services from online feedback from the receiving user.

10. The method according to claim 1, further comprising providing to the conveying user the receiving user's degree of interest in the identified gift class.

11. The method according to claim 1, wherein the fulfillment center sends the gift item to the receiving user's physical address.

12. The method according to claim 1, further comprising disclosing the identity of the selected gift item to the conveying user after its purchase.

13. The method according to claim 1, further comprising providing, by the conveying user using the input device, a price attribute prior to the selecting, by the processor, of the gift item.

14. The method according to claim 1, further comprising, prior to the gift item's purchase:
   notifying the conveying user, by the processor, of the selected gift item's price; and
   facilitating authorization, via the input device, of the gift item's purchase.

15. A method for selecting and sending relevant and personalized gifts using an online personal gift profile having personal preference data, comprising:
   providing, by a conveying user, the identity of a receiving user, the identity being an electronic representation of the receiving user on an input device;
   selecting, by the conveying user using the input device, a gift-class from among a plurality of gift classes available online, wherein the selected gift-class comprises a plurality of gift items;
   identifying, by a processor, the personal gift profile of the receiving user from the receiving user's identity;
   retrieving, by a processor, the personal preference data of the receiving user from the personal gift profile, the preference data providing detailed information about the receiving user's choices regarding one or more products and services;
   determining, by the processor, from the personal preference data if the selected gift class is acceptable to the receiving user;
   determining, by a processor, from the personal preference data if the selected gift-class is acceptable to the receiving user;
   sending, by a processor, the selected gift class, at least a part of the personal perference data and the receiving user's physical address to a fulfillment center;
   selecting, by the fulfillment center, a gift item from the selected gift-class using the personal preference data wherein the identity of the selected gift item is not disclosed to the conveying user prior to its purchase and
   sending, by the fulfillment center, the selected gift item to the receiving user's physical address.

16. The method according to claim 15, wherein the receiving user's physical address remains undisclosed to the conveying user.

17. The method according to claim 15, further comprising purchasing the selected gift item online prior to sending to the receiving user.

18. The method according to claim 15, wherein the conveying user selects the gift item based on the receiving user's degree of interest in the gift item.

19. The method according to claim 15, further comprising notifying the receiving user prior to the delivery of the selected gift item.

20. The method according to claim 15, wherein the conveying user and the receiving user are members of an online social network having a plurality of members, and wherein the online social network allows members to communicate with one another online.

21. The method according to claim 15, further comprising disclosing to the conveying user the identity of the selected gift item after its purchase is completed.

22. The method according to claim 15, further comprising providing, by the conveying user using the input device, a price attribute prior to selection of the fulfillment center's selection of the gift item.

23. The method according to claim 15, further comprising, prior to the gift item's purchase:
   notifying the conveying user, by the processor, of the selected gift item's price; and
   facilitating authorization, via the input device, of the gift item's purchase.

24. A system for selecting and sending relevant and personalized gifts using an online personal gift profile having personal preference data, comprising:
   an electronic data store having the personal gift profile including the personal preference data;
   the electronic data store containing a plurality of gift-classes and gift items;
   a processor in communication with the electronic data store and configured to receive a gift class from a conveying user, the processor being responsive to the gift class, and searching the electronic data store to determine from the personal reference data if the gift-class is acceptable to a receiving user, and selecting a gift item from the gift-class using the personal preference data wherein the identity of the selected gift item is not disclosed to the conveying user prior to initiating delivery;
   a communication device in communication with the electronic data store, the communication device enabling the conveying user to initiate delivery of the selected gift items to the receiving user;
   a fulfillment system, coupled to the communication device, the fulfillment system being a computing device enabling a merchant to initiate a delivery of the selected gift item to the receiving user's physical address.

25. The system according to claim 24, further enabling the conveying user to purchase the selected gift online.

26. The system according to claim 24, wherein the personal preference data is hidden from the conveying user.

27. The system according to claim 24, wherein the receiving user's physical address remains undisclosed to the conveying user.

28. The system according to claim 24, wherein the system is implemented in an online social network.

* * * * *